Aug. 13, 1968  J. R. W. HALE  3,396,992
CONNECTOR FOR HOT FLUID CONDUITS
Filed Dec. 15, 1966  2 Sheets-Sheet 2

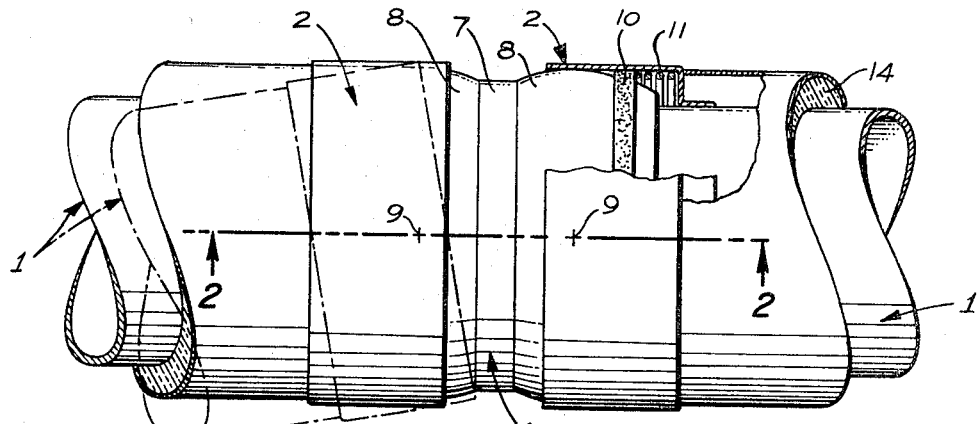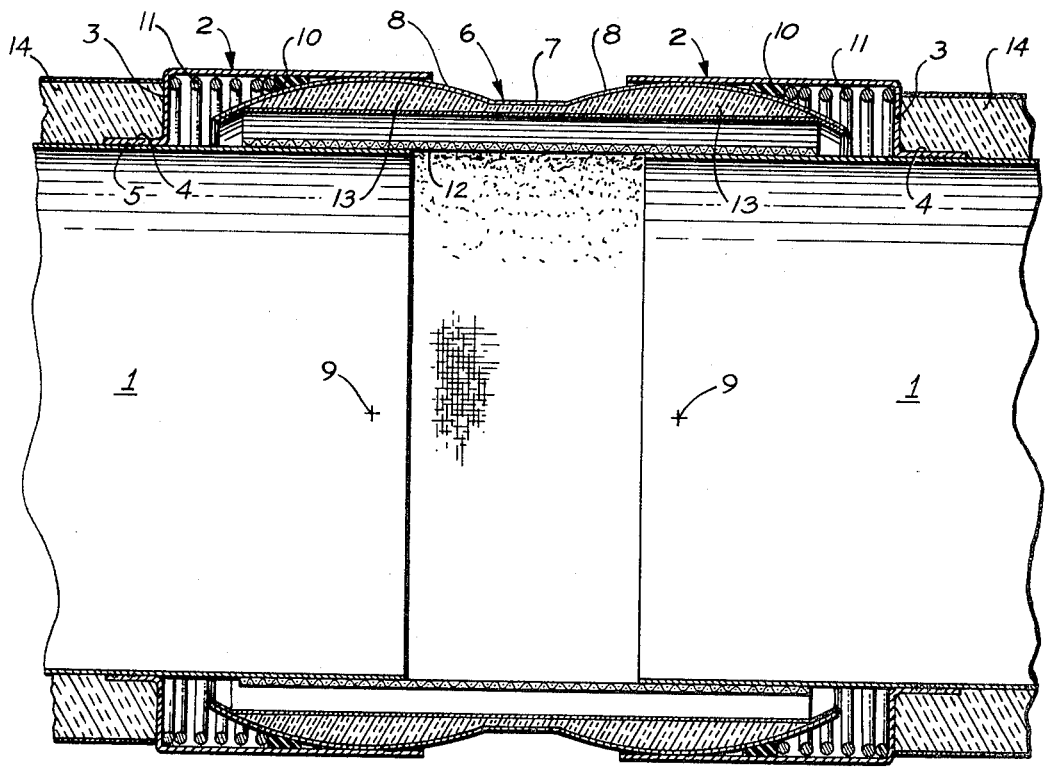

JESSE R.W. HALE
INVENTOR.

BY *Lyon t Lyon*
ATTORNEYS

United States Patent Office 3,396,992
Patented Aug. 13, 1968

3,396,992
CONNECTOR FOR HOT FLUID CONDUITS
Jesse R. W. Hale, Gardena, Calif., assignor to General Connectors Corporation, Burbank, Calif., a corporation of California
Filed Dec. 15, 1966, Ser. No. 602,087
2 Claims. (Cl. 285—100)

ABSTRACT OF THE DISCLOSURE

An articulated heat resisting connector particularly intended for gas conduits employed in aircraft, and including a pair of hollow spherical journals fitted between internal and external sleeves, and redundant internal and external seals between each journal and the corresponding sleeves. A spring tends to separate one set of seals.

Summary of the invention

This invention relates to connectors for hot fluid conduits, and included in the objects of this invention are:

First, to provide a connector which incorporates means whereby the more vulnerable portions of the connector are protected from the full temperature of the fluids being conducted through the connector.

Second, to provide a connector wherein the conduits are adjustable about two axially spaced centers in such a manner as to permit both angular and lateral displacement.

Third, to provide an articulated connector, which may be arranged to provide redundant seals, so that in the event of failure of one seal, one or more backup seals prevent leakage, thus permitting use of an articulated connector where, previously, a fixed connector was necessary.

With the above and other objects in view, as may appear hereinafter, reference is directed to the accompanying drawings in which:

FIGURE 1 is a side view of the connector with a portion broken away to illustrate internal construction, and indicating, by broken line, an angular position of one of the conduits, the conduits being shown fragmentarily.

FIGURE 2 is an enlarged sectional view taken through 2—2 of FIGURE 1, showing the conduits in axial alignment, the conduits being shown fragmentarily.

Figure 3:
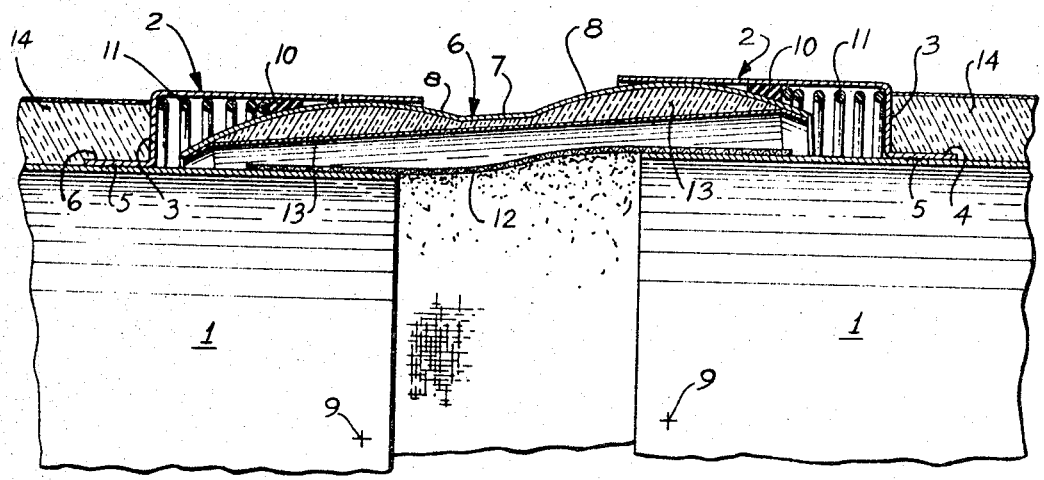
FIGURE 3 is a fragmentary sectional view showing the conduits in an offset relation.

Reference is first directed to FIGURES 1, 2, and 3. The connector is primarily intended to join a pair of conduits, but may be arranged to join a single conduit to a bulkhead or other structure. In the construction illustrated, a pair of conduits 1 is provided, or for purposes of installation, short cylindrical members may be provided which are in turn joined to the conduits.

Each conduit or cylindrical member is provided with a cylindrical bonnet 2, having an internal flange 3 at one end which in turn is joined to a cylindrical extension 4, closely fitting the conduit and welded thereto, as indicated by 5. The conduit and bonnet define an annular channel or chamber, the open side of which faces axially.

A connecting sleeve 6 is provided, which is preferably formed of sheet metal, and includes a cylindrical midportion 7, and outwardly enlarged journals 8, constituting the end portions of the sleeve. Each journal is in the form of a spherical zone, and inasmuch as the wall thickness of the sleeve is uniform, each journal defines as internal surface, which is concentric with its outer surface. The centers of curvature, designated 9, of the two journals are axially spaced.

The journals 8 are dimensioned to fit slidably within the bonnets 2, in contact with the inner surfaces of the bonnets. The centers of curvature 9 coincide with the axes of the conduits 1. Each conduit may be pivoted universally about the corresponding center of curvature, and by reason of the axial spacing of the two centers of curvature, the conduits may be relatively displaced laterally, as indicated in FIGURE 3.

A seal ring 10 is interposed between the distal portions of the journals 8, and the surrounding bonnet 2. A spring 11 is interposed between each seal ring and the corresponding internal flange 3 of the bonnet 2.

It will be observed that the portion of the conduit within the bonnet serves to separate the seal ring and spring from direct contact with fluids flowing in the conduit. Further protection for the seal is afforded by the distal portion of the journal.

In addition, a flexible sleeve 12 may be fitted over the ends of the conduits 1, and extend therebetween. The flexible sleeve may be a woven metal mesh, and is not intended to form a seal. The presence of the seal reduces heat transfer so that the region occupied by the seal rings 10, and springs 11, may be maintained materially below the temperature of the fluid flowing in the conduits.

In addition, the internal surface of the connecting sleeve 6 may be coated with an insulation 13. The selection of the insulation depends upon the temperatures at which it is desired to conduct fluids within the conduit. For example, the insulation may include glass fibers, asbestos, or various ceramic materials. To minimize heat loss while conducting high temperature fluids, the conduits 1 are encased in appropriate insulation, designated 14.

Figure 4:
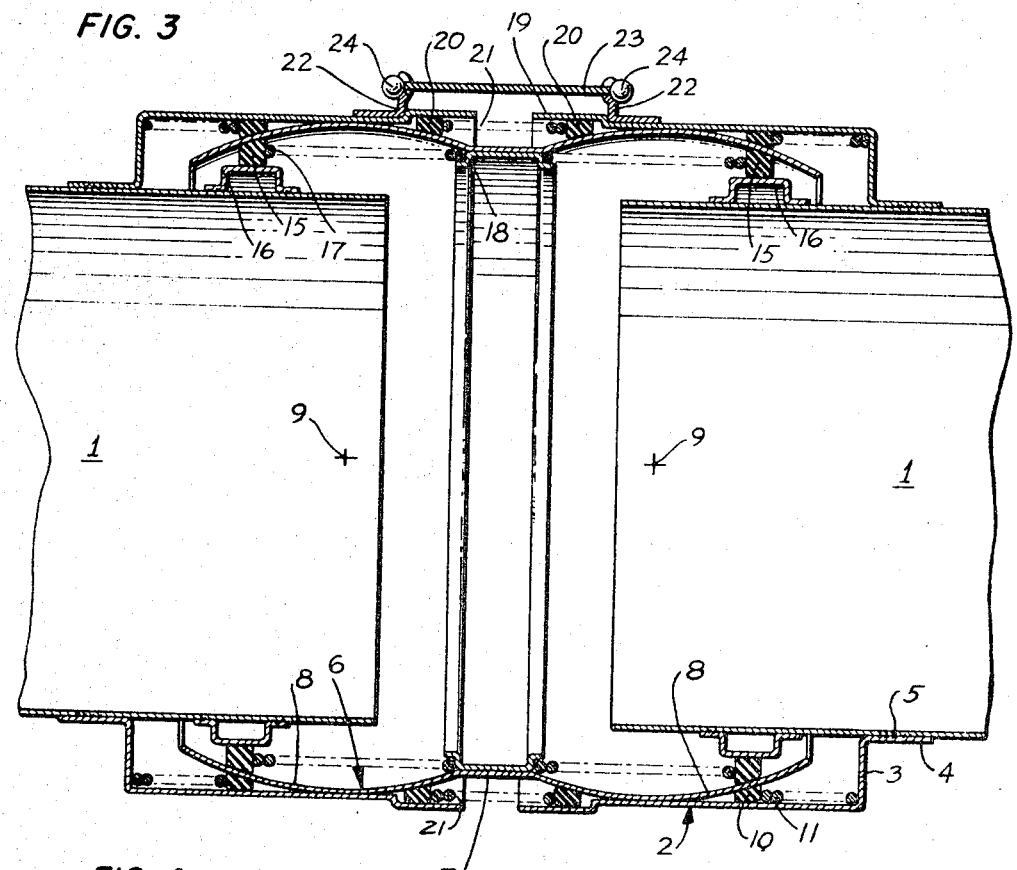
FIGURE 4 is a transverse sectional view, similar to FIGURE 2, illustrating a modified form of the connector.

Reference is now directed to FIGURE 4. In some instances it is desirable to provide redundant seals. That is, should the connector be used under conditions in which a seal failure would have serious consequences, the connector may be provided with one or more sets of redundant seals.

An internal redundant seal is provided by means of seal rings 15, extending between the spherical recesses formed within the journals 8, and the conduits 1. The seal rings 15 may occupy the entire distance or may be reduced in radial dimension by provision of annular ribs 16, secured to the conduits 1.

The seal rings are urged into sealing position by means of springs 17, which abut an internal bracket 18, provided within the cylindrical midportion 7 of the connecting sleeve. Or, if desired, a single continuous spring may extend between the seal rings 15.

An external redundant seal may be provided. In this case, the confronting ends of the bonnets 2, may be enlarged to form seal ring hoods 19, containing seal rings 20, which engage the spherical zone journals 8. The seal rings 20, and the seal rings 10, define planes located on opposite sides of the center of curvature 9. A single spring or a pair of springs 21 extend between the seal rings 20 to maintain the seal rings in their sealing condition.

It should be noted that while two redundant sets of seal rings are illustrated in FIGURE 4, that either or both sets may be employed as desired.

If the conduits are so mounted that they may be subjected to forces tending to separate the conduits, each cylindrical bonnet 2 may be provided with an external flange 22, forming an anchor flange. The pair of flanges thus provided, are notched to receive the extremities of a set of cables 23, having enlarged ends 24.

While particular embodiments of this invention have been shown and described, it is not intended to limit the same to the details of the constructions set forth, but instead, the invention embraces such changes, modifications and equivalents of the various parts and their relationships as come within the purview of the appended claims.

I claim:
1. A connector, comprising:
   (a) a pair of cylindrical members forming the confronting ends of a pair of conduits;
   (b) cylindrical bonnets secured to said members and forming therewith a pair of annular channels having open sides disposed in confronting relation, and closed distal sides;
   (c) a sleeve including a pair of spaced hollow journals, each defining internal and external spherical zones, said journals having axially spaced centers of curvature and fitting between said cylindrical members and said bonnets for movement about said centers;
   (d) a pair of seal rings interposed between said journals and said bonnets; said seal rings defining planes at the axially distal sides of said centers;
   (e) and springs interposed between said seal rings and the distal sides of said channels;
   (f) said seal rings and said springs being separated from direct exposure to fluids moving in said cylindrical members by the walls of said cylindrical members and distal ends of said journals;
   (g) a redundant pair of seal rings interposed between the inner surfaces of said journals and said cylindrical members;
   (h) and at least one spring interposed between said redundant seal rings.

2. A connector, comprising:
   (a) a pair of cylindrical members forming the confronting ends of a pair of conduits;
   (b) cylindrical bonnets secured to said members and forming therewith a pair of annular channels having open sides disposed in confronting relation, and closed distal sides;
   (c) a sleeve including a pair of spaced journals defining spherical zones having axially spaced centers of curvature, said journals fitting within said bonnets for movement about said centers;
   (d) a first pair of seal rings interposed between said journals and said bonnets and said seal rings defining planes at the axially distal sides of said journal;
   (e) springs interposed between said seal rings and the distal sides of said channels;
   (f) said seal rings and said springs being separated from direct exposure of fluids moving in said cylindrical members by the walls of said cylindrical members and distal ends of said journals;
   (g) a pair of redundant seal rings interposed between the confronting open ends of said bonnets and the axially proximate sides of said journals;
   (h) and a spring interposed between said redundant seal rings;
   (i) each first seal ring and corresponding redundant seal ring defining planes on opposite sides of the center of curvature of their common journal.

References Cited
UNITED STATES PATENTS

| 617,833 | 1/1899 | Kuhn | 285—261 |
| 656,667 | 8/1900 | Schmid | 285—262 X |
| 2,117,152 | 5/1938 | Crosti | 285—263 |
| 2,158,131 | 5/1939 | Laurent | 285—267 |
| 3,206,229 | 9/1965 | Kramer | 285—114 |
| 3,288,495 | 11/1966 | Newell et al. | 285—53 |

FOREIGN PATENTS

| 845,129 | 7/1952 | Germany. |
| 1,218,820 | 6/1966 | Germany. |
| 520,715 | 5/1940 | Great Britain. |

CARL W. TOMLIN, *Primary Examiner.*

R. G. BERKLEY, *Assistant Examiner.*